July 24, 1956
G. WHITE
2,756,288
MONITORING DEVICES
Filed Aug. 2, 1952
2 Sheets-Sheet 1
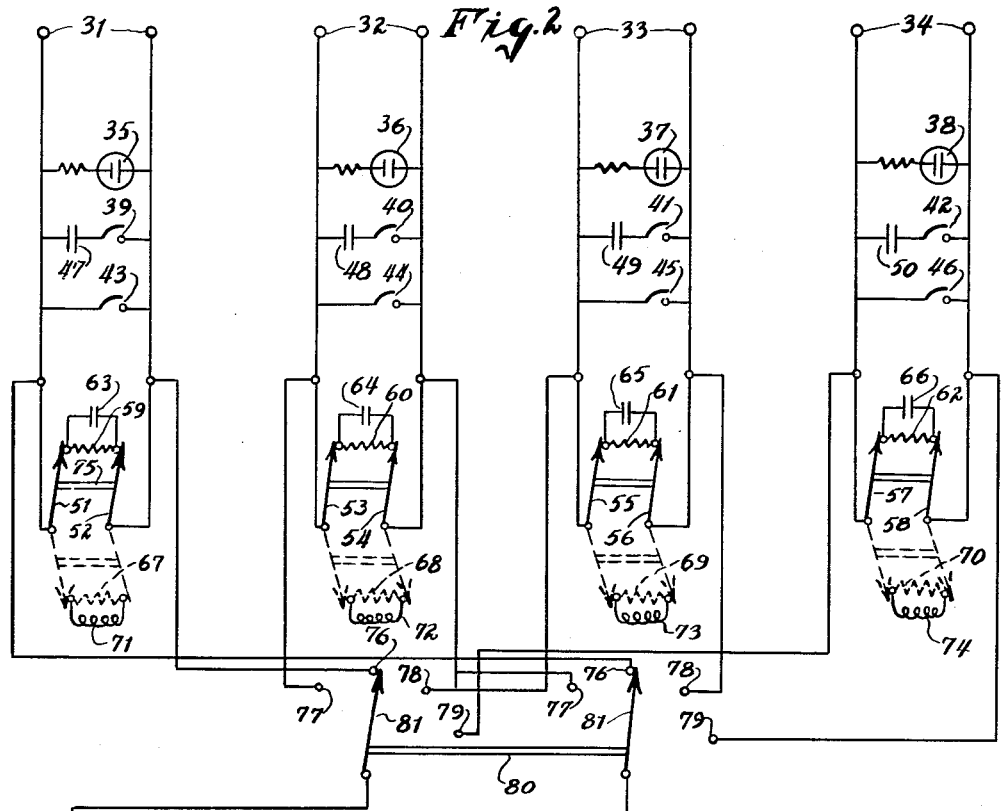
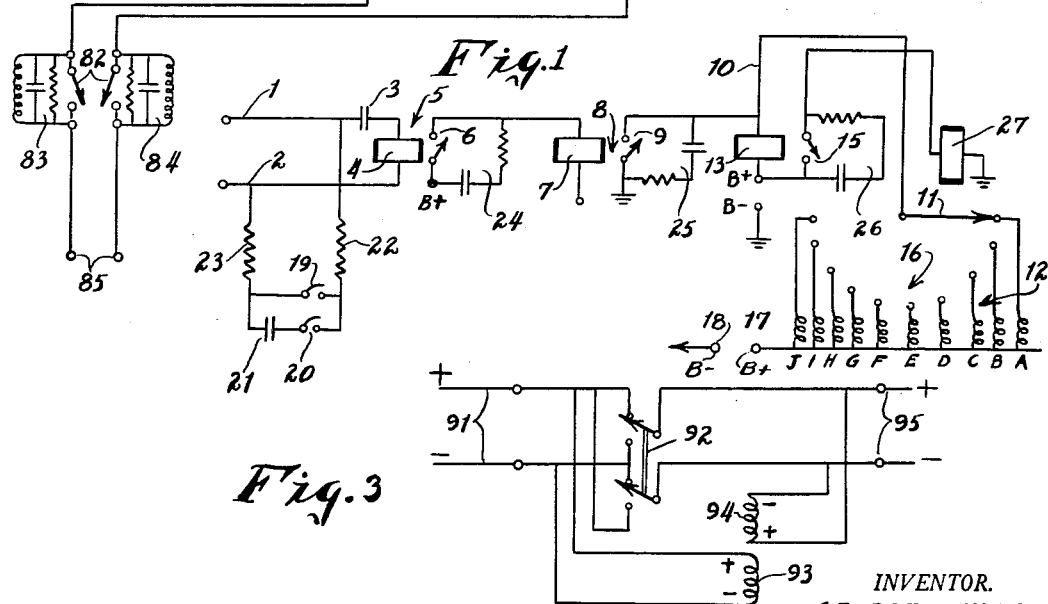
INVENTOR.
GEORGE WHITE
BY
ATTORNEY

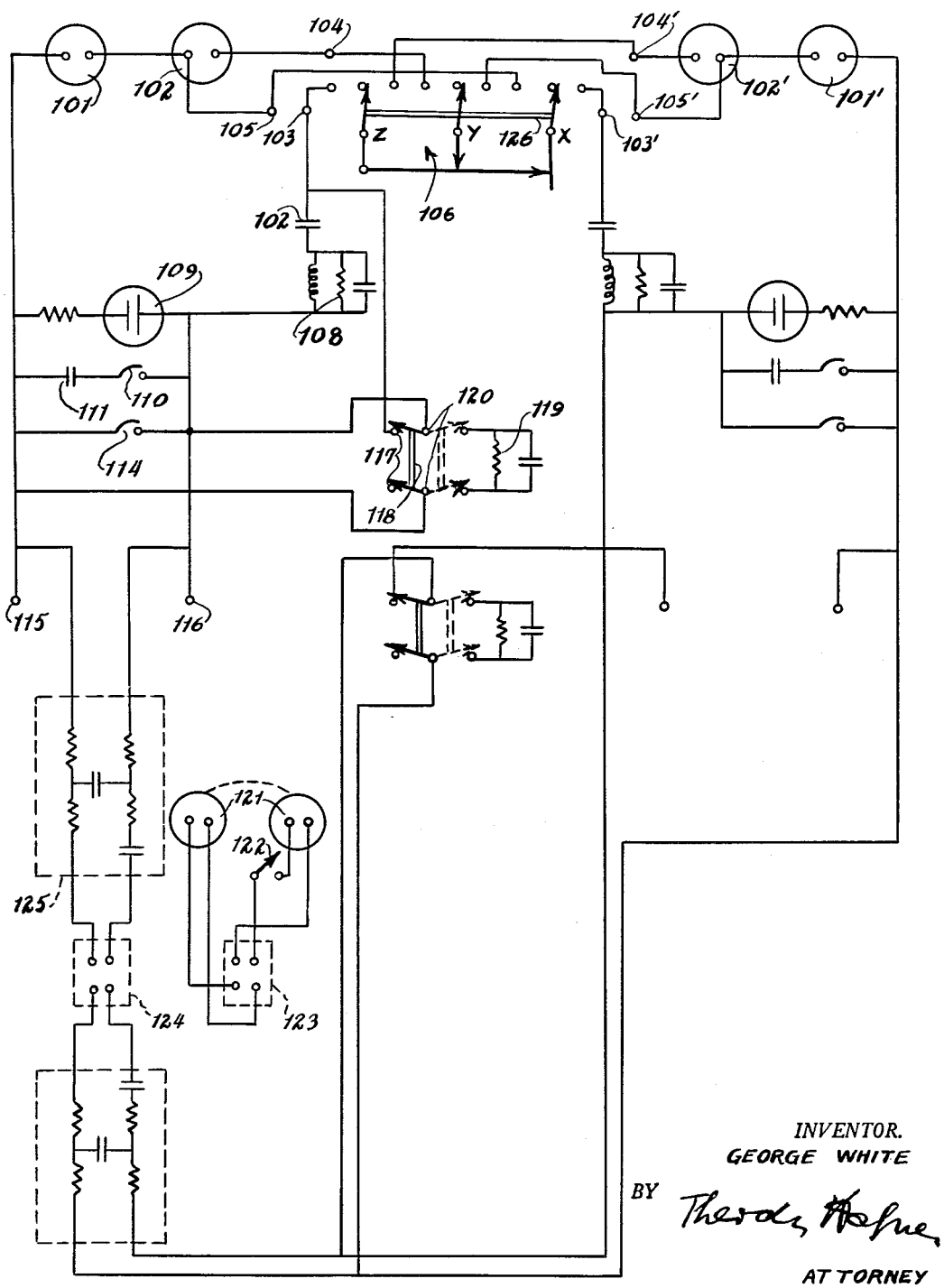

United States Patent Office 2,756,288
Patented July 24, 1956

2,756,288

MONITORING DEVICES

George White, Newark, N. J.

Application August 2, 1952, Serial No. 302,448

5 Claims. (Cl. 179—175.2)

This invention relates to monitoring devices and more specifically to the scientific investigation of electrical signal transmission such as waves of any type especially in the form of sound or pulses which are to be observed or recorded.

A specific use of this equipment is where evidence or proof is to be introduced in an action legal or administrative by city, county, state or government.

One of the objects of this invention is to connect the monitoring equipment proper such as a telephone, counter, or recorder with one or more lines to be monitored in such a manner as to reduce the connecting noise or click to a minimum, i. e. below audibility for the subscriber.

Another object of the invention is to reduce the discharge of the line caused by the monitoring device to a minimum, or at least to start it at a minimum, with a subsequent increase occurring only gradually.

A further object of the invention is, at the time of connection, to cause a gradual or slow discharge or fadeout of the line current, thus obliging at least one of the conversing parties to repeat at least part of its message.

Still another object of the invention is to permit of monitoring several lines practically simultaneously.

A more specific object of the invention is a bridging network controlling a pulse counter or recorder and including a charging capacitance in series with a pulse counter or recorder and provided with a charge retarding circuit or circuit element; such network being connected across one or more lines to be monitored to permit automatic evaluation or registration of pulse messages such as dialing pulses.

A further object of the invention is a monitoring network adapted selectively to be connected to a number of switching networks and including charge receiving capacitances and charge retarding impedances such as resistances, inductances, or combinations thereof.

A further specific object of the invention is a number of switching networks adapted to be connected to a corresponding number of lines to be monitored, and a common monitoring network to be connected to each of these switching networks to permit monitoring while at the same time permitting the lines to be monitored to be held in different conditions such as short-circuited or at stand-by.

Still another object of the invention is a monitoring network permitting practically simultaneous observation of several lines while at the same time selectively permitting two way conversations over one or between several lines, and involving two or more parties.

These and other objects of the invention will be more fully apparent from the drawings annexed herewith in which Fig. 1 shows a pulse counter involving certain aspects of the invention.

Fig. 2 shows a diagram permitting monitoring of several lines.

Fig. 3 shows diagrammatically a line reversal polarity switch facilitating monitoring and Fig. 4 shows a monitoring equipment permitting two-way conversations.

Fig. 1 shows a circuit diagram permitting pulse counting in accordance with the invention.

In Fig. 1, lines 1 and 2 represent the two input leads of the impulse counter over which pulses are sent to a 257 mfd. condenser 3 to the winding 4 of the polarized relay 5. When winding 4 is energized by a pulse, contacts 6 are momentarily (for the duration of one pulse) closed. This in turn energizes the winding 7 of slave relay 8 momentarily. When winding 7 of the slave relay 8 energizes, its contacts 9 close momentarily. This set of contacts performs two operations simultaneously.

Firstly, it allows pulses to be fed through line 10, contact arm 11 to the "A" branch of counter 12.

Secondly, when contacts 9 of slave relay 8 close they also energize coil 13 of slow release relay 14. Contacts 15 of slow release relay 14 close and will remain closed for the duration of the total number of pulses to be counted by the selected counter element A to J of counter 12.

When the pulses directed to a counter element A to J are completed, slow release relay contacts 14 will open. This in turn causes the contact arm 11 of stepping switch 16 to select the next counter element B.

Power is derived from rectified A. C. or D. C. or a battery, schematically indicated at 17, 18. The voltage necessary to operate the circuit depends on the resistance of the coil windings used in each relay and in the stepping switch.

Part 19 represents an open circuit jack permitting a direct circuit connection to the pulse line over the line balancing resistors 22, 23 mentioned below.

Part 20 represents a similar type jack in series with a .5 mfd. condenser 21 inserted in one leg of the line to form a high impedance circuit. Jack 20 can be used to connect to a tape recorder, head phones, provided with a click suppressor circuit as will be explained further below.

250-ohm resistors 22, 23 are placed in series with each leg of the line connecting to open circuit jacks 19, 20. This will prevent loading or mismatch due to improper matching caused by the device connected across jacks 19, 20.

The circuit of Fig. 1 functions as follows:

Condenser 3 is a blocking condenser used in series with one leg of relay 5 in order to prevent the D. C. voltage from entering or energizing winding 4. Relay 5 used in this type circuit is a highly sensitive polarized relay.

The resistance of the winding is so selected that when the coil is pulse-energized, the rapid field build-up and collapse (when the pulse is completed) will not cause holdover or so called slow release.

Contacts 6 are only used as an automatic switch which will switch on and off the B+ supply to the slave relay 8. The contacts will follow whatever pulse rate is fed into the line input circuit.

Condenser and resistor combination 24 is used across the contacts to absorb the contact-make and break peaking voltage.

Slave relay 8 is designed to further the function of the circuit. Upon receiving the pulse of B+ voltage from the contacts 6 of polarized relay 5, slave relay 8 will follow the pulse rate of polarized relay contacts 6.

Winding 7 of slave relay 8 is of high resistance, about 10,000 ohms. This minimizes the current drawn through contacts 6 of relay 5.

Contacts 9 of slave relay 8 are rated at approximately 3–4 amps. because of inductive loading, the contacts are quick acting and will follow the pulsed B+ voltage fed to winding 7 which in turn controls contacts 9 of relay 8.

Suppressor circuit 25 is used to quench the contact arc and is similar to that for contacts 6 at 24.

Relay 14 represents the time control or slow release relay 14. The resistance of winding 13, the construction of the copper heel are so selected as to produce the proper time lag in terms of milli-seconds.

Suppressor circuit 26 is similar to that used at 24.

Contacts 15 in this circuit are used to control the inductive load of the master selector stepping switch coil 27.

The operation of contacts 9 of relay 8 will close contacts 15 of slow release relay 14. This in turn energizes the master stepping switch winding 27 which relates to counting switches A to J.

When contacts 15 close, the B+ voltage will energize coil 27 of switch 16.

Coil 27 remains energized until the last pulse passes at which time contacts 15 open and in turn release the B+ on 27.

The movable arm 11 of eleven point stepping switch 16 sliding over contacts 11' will not move until contacts 15 are open. Arm 11 as soon as stopped over any of contacts 11', completes the counting circuit winding which will actuate the corresponding counting winding A to J of counter 12.

Each unit "A" to "J" represents an eleven point stepping switch.

Each of stepping switches "A" to "J" includes a numbered drum in otherwise well known manner, (not shown) mounted on its rotating shaft which pivots with the wiper arm.

Each of these switches is of three deck eleven contact type, of which only two of the three decks are used. This provides enough space for the numbered drum to be mounted on the shaft. Each of the stepping switches A to J follows the number of impulses sent to it, the numbered drum will step simultaneously and come to rest on the proper number which will be the sum of the impulses sent to the selected stepping switch.

Fig. 2 represents a master multi line monitoring selector in accordance with the invention.

In Fig. 2 lines 31 through 34 represent four individual pairs of lines which will connect across a telephone line carrying a conversation, dial impulse, ringing voltage etc. to be investigated in and with the aid of this invention.

Indicating systems including neon lamps 35 through 38 will flash when the 105 volts A. C. ringing pulse voltage is applied.

Open circuit jacks 39 through 42 are connected in parallel with each line input 31 through 34. This permits a single line to be jacked into at any time and by so doing to form two separate lines but having a common input.

Open circuit jacks 43 through 46 have the same basic features as jacks 47 through 50 with the exception of a .25 mfd. condenser 47—50 added in series with one leg of each jack 39—42. This condenser is used to prevent direct loading of line or impedance mismatch, also to prevent D. C. from entering the line or apparatus to be used.

Ganged contact arms 51—57 of a three position lever switch, serves to connect the following elements.

A 17-ohm resistor 59 through 62 is used to throw a momentary short circuit across lines 31 through 34. This short circuit causes a line loss or amplitude drop, and in so doing, will cause any sound heard by the subscriber over the line to undergo a slow fade.

A .057 mfd. condenser 63 through 66 is used in conjunction with resistor 50 through 62 to absorb the click when resistor 59 through 62 is placed across the line. Also, when such condenser is used, it aids in causing fading when used together with resistor 59 through 62.

Parts 67 through 70 indicate the resistance component of an inductance unit 71 through 74. Resistance component 67 through 70 across lines 31 through 34 serves to produce a holding circuit. Line holding is used when one phone is used to talk over two phone lines, and, while the first party is talking, another line rings. At this point, a holding bridge is placed across the first line while the other line is being answered.

Thus for example unit 75 will represent a three position lever switch movable upward and downward in direction of arrows 75', 75" with a set of contacts common to the line input 85 that will enable the user to select any one of the circuits across its stationary switch positions. In the first or top position arms 51, 52 are connected over capacity shunted resistor 59. In the second or medium position, arms 51, 52 are connected over inductance 72 and in the third or bottom position arms 51, 52 are directly connected (over switch 81) to line terminals 85.

Stationary double pole contacts 76 through 79 belong to a four position rotary switch, each one of four sets of double pole stationary contacts being placed across one of the four lines.

The double pole four position rotary switch is schematically indicated at 80. At 81 there are indicated the two wipers of rotary switch 80 movable from one of contact pairs 76 to 78 to another and in direction of arrows 81', 81".

A double pole single throw switch is schematically indicated at 82 having make or break contact arms. This switch will short circuit return lines 83, 84. When this action takes place, there will be a direct connection to the main line, or if left in the open position, it will allow all parts to function.

Lines 83, 84 comprise each a 250 ohm resistor which is placed in series with each leg of the output line to prevent impedance mismatch or line loading; a click suppressing condenser of .23 mfd. is used to suppress the click when the switch is opened and closed; the inductance unit together with its own internal resistance is used in conjunction with resistor and condenser to set up a click reduction reactor circuit.

The output terminals of this unit are indicated at 85.

The following operations can be performed at this point:

Any one of the four input lines can be monitored one at a time without line loading.

With the aid of a test phone it is possible to dial a subscriber for test purposes on any one of the four lines 31 to 34 available.

Any conversation or dialing can be recorded.

With the aid of the proper equipment one can talk to one or with two persons at once or if necessary hold a two way conversation within all three persons simultaneously.

The circuit of Fig. 2 operates as follows:

It covers four separate telephone lines 31 through 34 in one compact unit. Each one of the four lines can be connected selectively, to be monitored.

Circuits 35 through 42 represent the indicating system used to notify the monitoring operator when a line is receiving its ringing voltage.

Jacks 43 through 46 connected directly across lines 31 through 34 enable the user by jacking into these points to perform the following operations:

Interconnections permitting multiple conversation, direct line recording, dial recording, dialing, monitoring, connecting a high impedance ringing device, etc.

Switch 75 is used in connection with contacts 51 through 58 and is a rotary switch with three positions. The positions used are as follows:

Center position or neutral: direct to each of lines 31—34.

Forward position or short: this position is used to throw a momentary short (fade) on the line being monitored; it will oblige the user to have to repeat his or her number called.

Rear position or line hold: this is used when an incoming call is to be held while the operator answers another incoming call. The call thus held will remain held until the operator returns switch to neutral.

Switch 80 is a double pole four position rotary switch. This switch enables the user to monitor or work on any one of the four lines 31 through 34—one at a time only, unless the special dual line compensator (automatic line polarity reversal switch such as shown in Fig. 3) is used.

Switch 82 used in this circuit is a shunt or compensating switch which allows the user to preload the line or short out the components used in preloading the line.

With the aid of terminals 85 or corresponding jacks the operator is able to monitor or dial out, record, dial record, etc. He can only use one line at a time of the four existing lines. When it is desired to speak or monitor more than one line at a time, it is necessary to use the "master multi-line bridge," or the "automatic line reversal polarity switch," such as indicated in Figs. 4 and 3 respectively.

When connecting output circuit terminals 85, it might be necessary to use the shunt control switch 82. The primary use of this switch is as follows:

When entering upon a line where there is apt to be a conversation, it would be necessary to use the shunt switch 124 in the "on" position (switch open). By doing this, the user of the monitoring equipment cannot be detected. Aso, this shunt will enable the user to use a wide variety of impedances without affecting the line. When shunt switch 82 is in the "off" position the component parts in the compensating reactor circuit are shorted out.

Fig. 3 shows an automatic line reversal polarity switch facilitating monitoring.

In Fig. 3, 91 indicates one main line including positive and negative leads.

Double pole double throw switch contacts 92 are part of the polarized relay armature shown schematically with two windings 93, 94 wound on a single core. When both windings are energized with the same voltage and of the same polarity, they are neutralized, and in this position the armature will remain up.

Output is indicated at 95 also including positive and negative leads. If the polarity of line 95 should be reversed it would actuate the polarized relay switch contacts 92.

This same above action also holds true for line 91.

In other words, if for any reason line 91 should change its polarity, and line 95 would remain the same, switch 92 would operate and polarity would be reversed on line 91. This action would now give line 91 the same polarity as line 95.

Switch 92—94 is primarily—though not exclusively—designed for, and to be used with the multi-line monitoring selector in Fig. 2. When used with the latter type unit, the operator is enabled to perform the following operations:

Line 91 is plugged into a phone line which contains one positive and one negative lead, making one line pair. Now, line 95 including an automatic switch is plugged into another phone line containing a pair or a so called polarized line. One is now able to connect the party on the first incoming line on the selector with any of the other open lines existing. If there is a party on the second line, the parties will now be able to carry on a conversation between them while the monitoring operator will control both lines completely. At any time while this conversation is carried on, the operator is able to talk to the two parties on the line. He also is in a position to hold a private conversation with any one of the parties on any existing line while holding the other, or vice versa. When this circuit is completed and the polarity is automatically adjusted so no line has a mismatch or reversed polarity, the monitoring operator is ready to operate the above described equipment.

In Fig. 4 part 101, 101' diagrammatically represents a receiver or receivers used to monitor a conversation or when properly wired used in conjunction with a transmitter or transmitters diagrammatically indicated at 102, 102'.

Transmitter or transmitters 102, 102' are only used when it is necessary to carry on a two way conversation.

Contacts 103, 104, 105 are elements of a dial selector switch contact assembly placed into the circuit.

Block 106 represents a dial unit with an internal contact arrangement including contacts X, Y, Z related to the switch contact points to be selected. When the dials are operated contacts Y and Z are pulsed.

Condenser 107 of .275 mfd. is a blocking condenser, and is used in the monitoring position only. In this monitoring position, contacts X, Y, Z of switch 106 hold a short on transmitter 102.

Part 108 represents a hash line filter including in parallel connection a .275 millihenries inductance, a .5 ohm resistor and a .028 mfd. condenser. This parallel circuit 108 is used when a two way conversation is to be carried on.

Neon lamp 109 serves to notify the operator of the equipment that a call is on the line.

Jack 110 represents a standard open circuit jack with a condenser 111 of .255 mfd. inserted in series with one leg of this jack and then connected between the lines 112, 113.

Jack 114 also is an open circuit jack connected directly across lines 112, 113.

Terminals 115 and 116 represent the input terminals to the unit.

At these points the telephone lines under investigation are connected to the monitoring contact elements 117 of switches 118. When contacts 117 are in open position condenser 107 of .275 mfd. will be used in the monitor circuit. When switch contacts 117 are closed, condenser 107 is shorted; this now allows the dial circuit 106 or the transmitter circuit to operate.

Short circuit 119 including a 17-ohm resistor and a .25 mfd. condenser in parallel with it, which when applied, causes the line under investigation to fade.

Switch 118 represents a three circuit switch unit with an automatic spring return in one position. The second or center position is left open and the third or forward position is used for talking or dialing.

A set 121 of ear phones is used to monitor two lines at once, with a suppressor circuit and a switch 122 to shut off one phone. The resistance of the phones is selected (i. e. at 50 ohms) to give the best impedance match to the line suppressor and filter circuit.

Four-prong male jack 123 cooperating with receptacle 124 will enable the user to take the phones out of the circuit at will.

A line balancing compensating network and also a noise reduction filter plus click quenching circuit is shown incorporated into one unit 125.

Switch 126 serves to connect terminals X, Y, Z, of dialing device 106 to terminals 103, 104, 105 as apparent from Fig. 4 and also to terminals 103', 104', 105'. This will allow the dial to be used in either one of the circuits, or neutral. This enables the operator to use the dial and then switch it out so that a line can be monitored used for conversation, etc.

The above unit should be used with the multi line selector of Fig. 2 if it is found necessary to hold a line or speak to several parties at once, or any combination thereof.

Each unit as explained in the preceding sections can be used per se or in combination with other units disclosed or undisclosed, without exceeding the scope of this invention.

The following modifications, among others, may be applied to the invention without exceeding its scope:

The lines to be monitored can be shunted by a suitable transformer and a blocking condenser; the transformer balancing the lines in its primary circuit so as to retard the connecting charge of the condenser and reduce noise to a minimum.

Blocking condensers can be replaced by using series resistors of the order of at least 500,000 ohms or vacuum tubes, transistors or crystal diodes.

Polarized, slave and slow-release relays can be replaced by a suitable vacuum tube or flip-flop circuit or by corresponding transistors or crystal diode circuits.

The pulse counter can be replaced by an electro-mechanical printer including a preferably spring or battery driven tape transport mechanism.

The indicating lamps can be replaced by high impedance ringers or similar circuits.

Jacks can be replaced by any type of switch or relay. Resistors can be substituted by an inductance with the same value of internal resistance.

Inductances can be substituted by using a combination of non-inductive resistors in combination with an inductance, or reactance. Switches such as 85, 82 can be substituted by single position switches, relays or other switches. Rotary switches such as shown at 80, 82 or 126 could be of the type shown at 75.

The suppression filter combination 83 and 84 can be substituted by suitable vacuum tube circuits, inductance units or any combination of units designed to accomplish a similar purpose.

Switch 92, 94, 95 can be replaced by suitable vacuum tube, transistor, or crystal diode circuits.

Receiver 101 can be replaced with a crystal head set, or a transistor or suitable vacuum tube circuit.

Transmitter 102 can be a carbon type, dynamic microphone or crystal, or condenser microphone on any other device converting acoustical energy into electric energy.

Dial switch 106 can be substituted by any other pulse selecting mechanism or a suitable electronic or mechanical circuit.

Circuit 108 can be substituted by an inductive resistive or reactive type circuit or, if desired, the circuit can be completely eliminated.

Condenser 111 can be substituted by a suitable matching transformer or electric circuit.

Filters and click-quenching suppressor circuit such as shown at 125 can be substituted by resistive bridging circuit, reactive filter network or an electronic bridging reactor circuit.

I claim:

1. In a monitoring system, a pair of input terminals adapted to be connected across at least one audio communication line which is connected to an earphone, and is to be monitored over a range including audio frequencies and direct current pulses, a pair of output terminals, monitoring means adapted to be connected across said output terminals, lines connecting input and output terminals, each of said lines having in series therewith means for storing the charge received from said audio communication line at the instance of connection, said storing means including a capacitance to be charged from said line and impedance means also in series with each of said lines and in shunt with each capacitance for retarding the charging rate of said capacitance, and means for short-circuiting said charge-storing and impedance means.

2. Monitoring system according to claim 1, comprising an additional capacitance shunted impedance means, inductance means, and switching means for connecting selectively across said input terminals said capacitance shunted impedance and said inductance means, and also for connecting said input terminals directly to said audio communication line.

3. Monitoring system according to claim 1, wherein said charge-retarding impedance means includes an inductance having resistance.

4. Monitoring system according to claim 1, wherein said charge-retarding impedance means includes an inductance and a resistance in shunt with said inductance.

5. Monitoring system according to claim 1 comprising signalling means across said input terminals for indicating a ringing condition on the audio communication line so as to permit the monitoring means to be connected after said ringing condition has ceased to exist.

References Cited in the file of this patent

UNITED STATES PATENTS

| | | |
|---|---|---|
| 1,640,085 | Madsen | Aug. 23, 1927 |
| 1,675,311 | Sengebusch | June 26, 1928 |
| 1,691,269 | Crocker | Nov. 13, 1928 |
| 1,752,429 | Fowler | Apr. 1, 1930 |
| 1,754,628 | Janson | Apr. 15, 1930 |
| 1,795,350 | Stehlik | Mar. 10, 1931 |
| 1,996,213 | Phelps | Apr. 2, 1935 |
| 2,141,286 | Baranowsky | Dec. 27, 1938 |
| 2,263,389 | Koenig | Nov. 18, 1941 |
| 2,287,164 | Bowsher | June 23, 1942 |
| 2,305,862 | Gilliver | Dec. 22, 1942 |
| 2,341,519 | Atkinson | Feb. 15, 1944 |
| 2,346,238 | Schmidt | Apr. 11, 1944 |
| 2,541,336 | Carroll | Feb. 13, 1951 |

OTHER REFERENCES

War Dept. Technical Manual TM 11–2016, Multiline Observing Equipment, ADW–BM–100, dated Aug. 29, 1944, pp. 4, 25, 33.